3,478,085
PREPARATION OF [4-(2-METHYLENEALKANO-
YL)PHENOXY] ALKANOIC ACIDS
Edward J. Cragoe, Jr., Lansdale, Pa., assignor to Merck &
Co., Inc., Rahway, N.J., a corporation of New Jersey
No Drawing. Filed Nov. 2, 1966, Ser. No. 591,431
Int. Cl. C07c 65/02; C07d 7/10; A61k 27/00
U.S. Cl. 260—473          13 Claims This invention relates to a novel method for the preparation of [4-(2-methylenealkanoyl)phenoxy]alkanoic acids and, also to the preparation of the nontoxic, pharmacologically acceptable salts, esters and amide derivatives thereof.

The products of this invention are diuretic and saluretic agents which can be used in the treatment of conditions associated with electrolyte and fluid retention and hypertension. When administered in therapeutic dosages, in conventional vehicles, the instant products effectively reduce the amount of sodium and chloride ions in the body, lower dangerous excesses of fluid levels to acceptable limits and, in general, alleviate conditions associated with edema.

The instant process consists in pyrolyzing 2,5-disubstituted-2-(4-carboxyalkoxybenzoyl)-6-(4-carboxyalkoxyphenyl)-3,4-dihydro-2H-pyran (II, infra) or the corresponding alkali metal salt, lower alkyl ester amide or lower alkyl amide derivative thereof at temperatures above the decomposition range of the starting material (II) as, for example, at temperatures in the range of from about 201–350° C. and, preferably, at temperatures in the range of from 250–300° C., to yield the corresponding [4-(2-methylenealkanoyl)phenoxy]-alkanoic acid or the corresponding salt, ester or amide (I, infra). The reaction may be conducted in the presence or in the absence of a suitable solvent; however, it is usually most practical to conduct the reaction without a diluent because, in general, decomposition occurs at temperatures which are usually equal to or slightly above the melting point of the starting materials (II) and, therefore, the reaction mixture is in a molten form. The following equation illustrates the process; however, it is to be understood that any corresponding salt, ester or amide of the 2,5-disubstituted-2-(4-carboxyalkoxybenzoyl)-6-(4-carboxyalkoxyphenyl)-3,4-dihydro-2H-pyran starting materials (II) can be substituted therefor in an otherwise similar process to yield the corresponding salt, ester or amide product:

fluorine, etc., lower alkyl, for example, methyl, ethyl, etc., lower alkoxy, for example, methoxy, ethoxy, etc. or, taken together, two X radicals on adjacent carbon atoms of the benzene ring may be joined to form an hydrocarbylene chain (i.e., a divalent organic radical composed solely of carbon and hydrogen) containing from 3–4 carbon atoms between their points of attachment, for example, trimethylene, tetramethylene, 1,3-butadienylene (i.e., —CH=CH—CH=CH—), etc.; $m$ is an integer having a value of 1–2 and $n$ is an integer having a value of 1–4.

A preferred embodiment of this invention consists in pyrolyzing a 2,5-di-lower alkyl-2-(4-carboxymethoxybenzoyl)-6-(4-carboxymethoxyphenyl)-3,4-dihydro-2H-pyran (IIa) to form a [4-(2-methylenealkanoyl)phenoxy]acetic acid (Ia). The following equation illustrates this method of preparation:

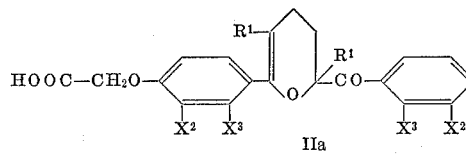 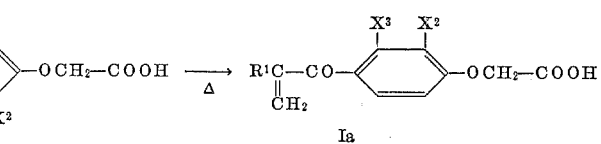

IIa                                Ia wherein $R^1$ is lower alkyl and $X^2$ and $X^3$ are similar or dis-similar members selected from hydrogen, halogen and lower alkyl. The foregoing class of compounds exhibits particularly good diuretic and saluretic activity and, therefore, constitutes a preferred subgroup of compounds within this invention.

The instant [4-(2-methylenealkanoyl)phenoxy]acetic acid products (I) and their corresponding salts, esters and amides, are generally obtained as crystalline solids and, if desired, may be purified by recrystallization from a suitable solvent or from a mixture of solvents as, for example, from carbon tetrachloride, butyl chloride, benzene, cyclohexane, etc., or from mixtures thereof.

The 2,5-disubstituted-2-(4-carboxyalkoxybenzoyl)-6-(4-carboxyalkoxyphenyl)-3,4-dihydro-2H-pyran starting materials (II) and the salts, esters and amides thereof, which are employed as starting materials in the process of this invention, are conveniently prepared by any one of several alternate routes. One method comprises heating a [4-[2-(secondary-aminomethyl)alkanoyl]phenoxy]alkanoic acid or the corresponding acid addition salt, ester or amide derivative thereof at temperatures above the melting point of the reactants. A second method relates to the etherification of a 2,5-disubstituted-2-(4-hydroxybenzoyl)-6-(4-hydroxyphenyl)-3,4-dihydro-2H-pyran with an haloalkanoic acid. A third synthetic method, and one which is particularly suitable for preparing the free carboxylic acid, i.e., the 2,5-disubstituted-2-(4-carboxyalkoxybenzoyl)-6-(4-carboxyalkoxyphenyl)-3,4-dihydro-2H-pyran, comprises hydrolyzing an ester or amide of the said pyran to the corresponding acid.

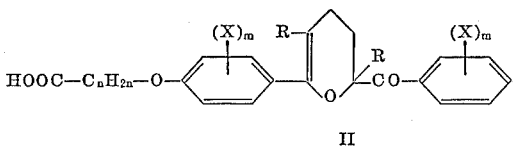 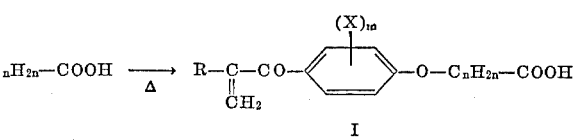

II                                 I wherein R is hydrogen, alkyl, for example, lower alkyl such as methyl, ethyl, propyl, isopropyl, butyl, pentyl, etc., trifluoromethyl substituted lower alkyl, for example, 2,2,2-trifluoroethyl, etc. or cycloalkyl, for example, mononuclear cycloalkyl containing from 5–6 nuclear carbon atoms such as cyclopentyl, cyclohexyl, etc.; the X radicals are similar or dissimilar members selected from hydrogen, halogen, for example, chlorine, bromine, iodine, The first of the aforementioned processes, that is, the deamination process, consists in heating a [4-[2-(secondary-aminomethyl)alkanoyl]phenoxy]alkanoic acid or a suitable acid addition salt, ester or amide derivative thereof, at the melting point of the reactant or at temperatures slightly higher than its melting point as, for example, at temperatures of up to about 200° C. Also, inasmuch as the starting materials are caused to react in their molten form, no solvent is required; it only being necessary to heat the said staring material at its melting point over a sufficiently protracted period. The following equation, wherein the reactant is in acid addition salt of a [4-[2-(secondary-aminomethyl)alkanoyl]phenoxy] alkanoic acid (III, infra), illustrates this method of preparation; however, it is to be understood that the free amine may also be employed in a similar manner to yield an identical product. Also, in lieu of the alkanoic acid starting material, the corresponding carboxylate salt, ester or amide derivative may also be employed in an analogous manner to yield the corresponding salt, ester or amide of 2,5-disubstituted-2-(4-carboxyalkoxybenzoyl) - 6 - (4 - carboxyalkoxyphenyl) - 3,4 - dihydro-2H-pyran:

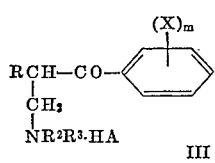

III wherein R, X, $m$ and $n$ are as defined above; $R^2$ and $R^3$ are lower alkyl radicals or, taken together with the nitrogen atom to which they are attached, a heterocyclic amine selected from piperidine, morpholine, etc. and HA represents an organic or inorganic acid capable of forming salts with amines, for example, hydrochloric acid, etc.

The second principal method for the preparation of the instant starting materials comprises treating a 2,5-disubstituted - 2 - (4 - hydroxybenzoyl) - 6 - (4 - hydroxyphenyl)-3,4-dihydro-2H-pyran (IV, infra) with an haloalkanoic acid or with an appropriate ester or amide derivative thereof, in the presence of a base; and, when an haloalkanoic acid reactant is employed and the corresponding carboxylic acid starting material (IIb, infra) is desired, converting the salt of the 2,5-disubstituted - 2 - (4 - carboxyalkoxybenzoyl) - 6 - (4 - carboxyalkoxyphenyl)-3,4-dihydro-2H-pyran (V. infra) thus obtained to the corresponding free acid (IIb, infra) by acidification of the reaction mixture. Suitable basic reagents which may be used in the process include alkali metal carbonates such as potassium carbonate, alkali metal alkoxides such as sodium ethoxide, etc. The following equation, wherein the etherification reagent employed is an haloalkanoic acid and the basic reagent is potassium carbonate, illustrates this method of preparation; however, it is to be understood that a suitable ester or amide of the haloalkanoic acid reactant may also be employed in an otherwise similar process to yield the corresponding ester or amide derivative of the 2,5-disubstituted - 2 - (4 - carboxyalkoxybenzoyl) - 6 - (4 - carboxyalkoxyphenyl)3,4-dihydro-2H-pyran (11b) and, also, that basic reagents other than potassium carbonate, such as sodium carbonate or sodium ethoxide may also be employed:

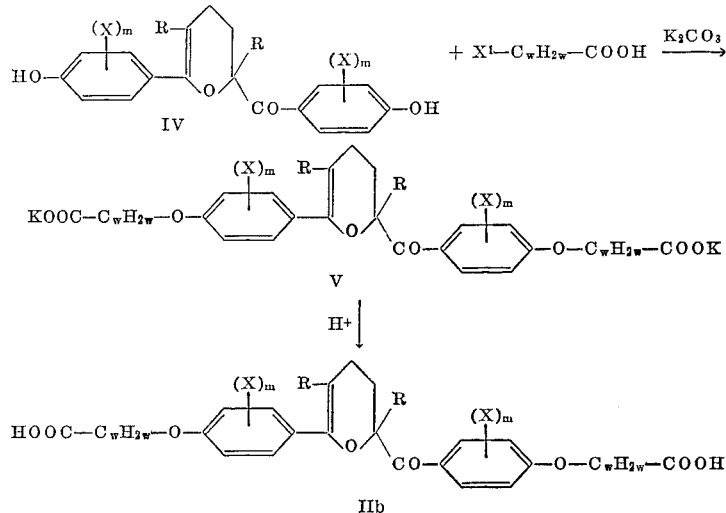

wherein R, XX and $m$ are as defined above; $w$ is an integer having a value of 1 or 3; $X^1$ is halogen, for example, chlorine, bromine, iodine, etc. and $H^+$ is the cation derived from an organic or inorganic acid, for example, hydrochloric acid. The choice of a suitable reaction solvent is dependent largely upon the character of the reactants employed, but in general, any solvent which is suitably inert with respect to the said reactants and in which they are reasonably soluble may be used. Dimethylformamide is a particularly suitable medium in which to conduct the process. Also, the reaction may be conducted at ambient temperatures but, generally, it is desirable to conduct the reaction at temperatures slightly above ambient temperature.

A third principal method for the preparation of the instant staring materials but one which is limited to the preparation of the carboxylic acid reactant, i.e., the 2,5-disubstituted - 2 -(4 - carboxyalkoxybenzoyl) - 6 - (4-carboxyalkoxyphenyl)-3,4-dihydro-2H-pyrans, and to the carboxylate salts thereof, relates to the hydrolysis of a 2,5 - disubstituted - 2 - (4 - alkoxycarbonylalkoxybenzoyl) - 6 - (4 - alkoxycarbonylalkoxyphenyl) - 3,4 - dihydro-2H-pyran and to the hydrolysis of the corresponding amide derivative thereof (VI). The hydrolysis is conducted by treating the said ester or amide with an aqueous solution of a base such as an aqueous solution of sodium bicarbonate; preferably, in the presence of an alcoholic solvent such as a lower alkanol. The carboxylate salt intermediate thus formed (VII, infra) may then be isolated for use as a starting material in the instant process or, alternatively, the said carboxylate salt (VII) may be treated with an acid to obtain the desired carboxylic acid compound (II). The following equation, wherein the basic reagent employed is sodium bicarbonate, illustrates this method of preparation; however, it is to be understood that other bases such as sodium carbonate, potassium bicarbonate, etc. may also be employed in an analogous manner to yield the corresponding carboxylate salts and, if desired, upon acidification, the corresponding carboxylic acid compounds (II):

and $x$ is an integer having a value of 1 or a number greater than 1.

The foregoing methods for the preparation of the [4-[2-(secondary-aminomethyl)alkanoyl]phenoxy]alkanoic acids and the salts thereof are described in U.S. Patent No. 3,251,064, issued May 10, 1966.

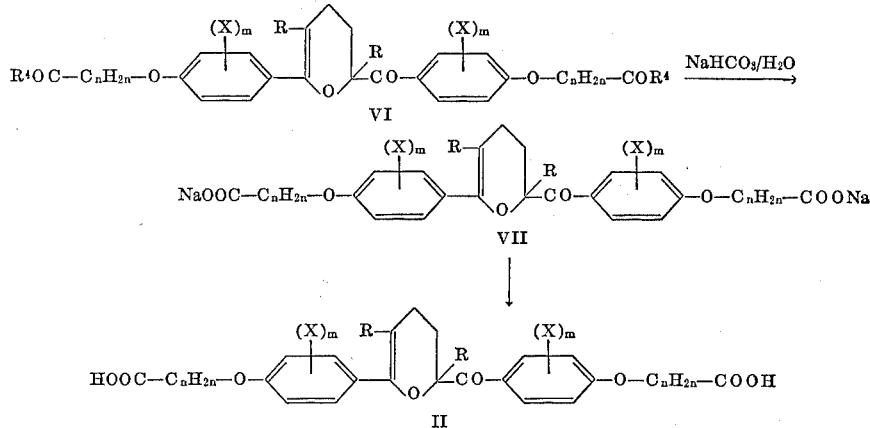

wherein R, X, $m$ and $n$ are as defined above and $R^4$ is alkoxy, for example, methoxy, ethoxy, etc., amino or lower alkyl-amino, for example, methylamino, ethylamino, etc.

The [4-[2-(secondary-aminomethyl)alkanoyl]phenoxy]-alkanoic acids and the acid addition salts thereof (III), which are employed as starting materials in the first of the aforementioned preparative methods, are synthesized by treating a (4-alkanoylphenoxy)alkanoic acid (VIII, infra) with formaldehyde or paraformaldehyde and the acid addition salt of a secondary amine as, for example, the acid addition salt of a dialkylamine, piperidine or morpholine, to yield the corresponding salt of the resulting Mannich amine, i.e., the salt of [4-[2-(secondary-aminomethyl)alkanoyl]phenoxy]-alkanoic acid (III), and the compound thus formed may either be isolated as such for use as a reactant in the process of this invention or, alternatively, may be treated with a weak base, such as sodium bicarbonate, to yield the corresponding free Mannich derivative, i.e., [4-[2-(secondary-aminomethyl)-alkanoyl]phenoxy]alkanoic acid (IIIa). The following equations illustrate the foregoing method for the preparation of the said [4-[2-secondary-aminomethyl)alkanoyl]phenoxy]-alkanoic acid compounds (IIIa, infra) and the salts thereof (III, infra); however, it will be appreciated that the corresponding ester or amide of the said acid (III) may also be prepared in an analogous manner by substituting the appropriate ester or amide starting material for the (4-alkanoyl-phenoxy)-alkanoic acid reactant (VIII) described therein:

The 2,5-disubstituted-2-(4-hydroxybenzoyl)-6-(4-hydroxyphenyl)-3,4-dihydro-2H-pyran starting materials of the second method described above for the preparation of the 2,5-disubstituted-2-(4-carboxyalkoxybenzoyl)-6-(4-carboxyalkoxy-phenyl)-3,4-dihydro-2H-pyran derivatives (IIb), i.e., the etherification process, are prepared by heating a nuclear hydroxy substituted 2-methylenealkanophenone (IX, infra) at temperatures in excess of room temperature, as, for example, at temperatures in the range of about 100–150° C. The time required for completion of the reaction depends largely upon the temperature employed but, in general, it can be stated that when optimal temperatures are used the time required is usually from 15 minutes to 24 hours. The following equation illustrates this method of preparation:

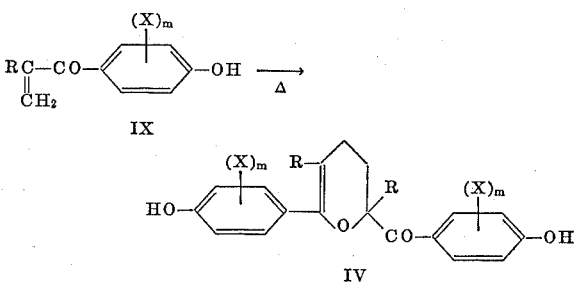

wherein R, X and $m$ are as defined above.

The nuclear hydroxy substituted 2-methylenealkanophe-

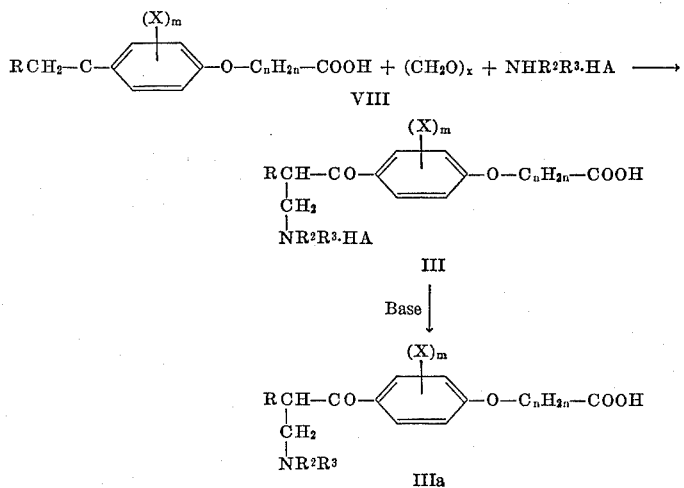

wherein R, $R^2$, $R^3$, X, $m$, $n$ and HA are as defined above nones (IX) described in the preceding paragraph, and a method for their preparation, are described in applicant's copending application Ser. No. 361,932, filed Apr. 20, 1964.

The 2-(4-alkoxycarbonylalkoxybenzoyl) - 6-(4-alkoxycarbonylalkoxyphenyl)-3,4-dihydro-2H-pyrans and corresponding amide derivatives (VI), described above in connection with the third method for preparing the 2,5-disubstituted-2-(4-carboxyalkoxybenzoyl)-6 - (4-carboxyalkoxyphenyl)-3,4-dihydro-2H-pyrans, are conveniently obtained by treating an appropriate 2,5-disubstituted-2-(4-carboxyalkoxybenzoyl)-6-(4-carboxyalkoxyphenyl) - 3,4-dihydro-2H-pyran with thionyl chloride to obtain the corresponding acid halide, followed by the reaction of the said halide with an appropriate alcohol such as methanol, ethanol, ethoxyethanol, etc. or with ammonia or an appropriate lower alkylamine such as methylamine, ethylamine, etc. The following equation illustrates this method of preparation:

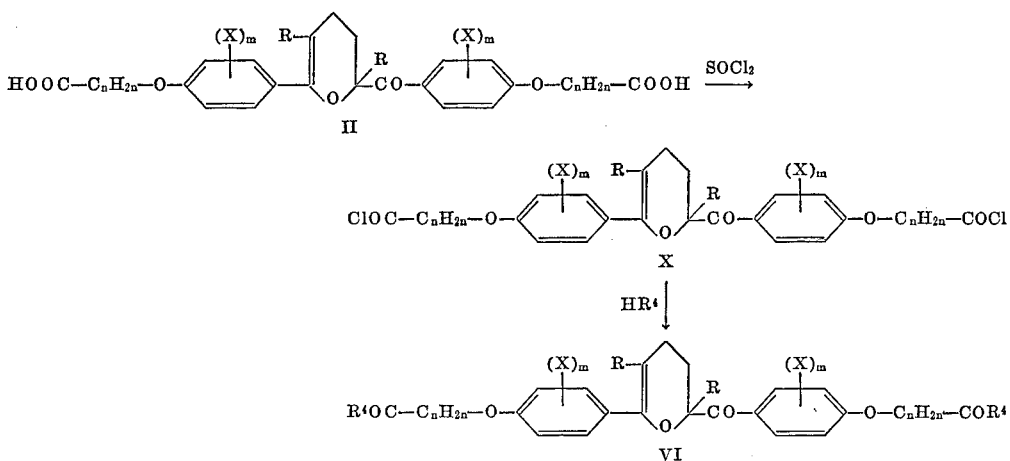

wherein R, R⁴, X, m and n are as defined above.

The examples which follow illustrate the process of this invention. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1

[2,3-dichloro-4-(2-methylenebutyryl)phenoxy]-acetic acid

Step A.—2,5-diethyl-2-(2,3-dichloro-4-carboxymethoxybenzoyl)-6-(2,3-dichloro-4-carboxymethoxy - phenyl)-3,4-dihydro - 2H-pyran: [2,3 - dichloro-4-(2-dimethylaminomethylbutyryl)phenoxy]-acetic acid hydrochloride (3.85 g., 0.01 mole) is placed in a reaction vessel and heated at 200° C. for three hours. The product is dissolved in chloroform (50 ml.), washed well with water and dried over magnesium sulfate. After distillation of the chloroform at reduced pressure, the product is recrystallized from nitromethane to yield 2,5-diethyl-2-(2,3-dichloro-4-carboxymethoxybenzoyl) - 6 - (2,3-dichloro-4-carboxymethoxyphenyl)-3,4-dihydro-2H-pyran having a melting point of 113–115° C.

Analysis.—Calculated for $C_{26}H_{24}Cl_4O_8$: C, 51.51; H, 3.99; Cl, 23.39. Found: C, 51.45; H, 4.33; Cl, 23.19.

Step. B. — [2,3-dichloro-4-(2-methylenebutyryl)phenoxy]-acetic acid: 2,5-diethyl-2-(2,3-dichloro-4-carboxymethoxybenzoyl)-6-(2,3-dichloro - 4 - carboxymethoxyphenyl)-3,4-dihydro-2H-pyran (4.0 g., 0.0066 mole) is heated at 300° C. at 1 mm. pressure in a small Claisen flask and then distilled. The 2.9 g. (98%) of distillate thus obtained is then recrystallized from butyl chloride to yield [2,3-dichloro-4-(2-methylenebutyryl)-phenoxy]-acetic acid, M.P. 124–125° C.

Analysis.—Calculated for $C_{13}H_{12}Cl_2O_4$: C, 51.51; H, 3.99; Cl, 23.39. Found: C, 51.23; H, 4.18; Cl, 23.49.

EXAMPLE 2

Ethyl [2,3-dichloro-4-(2-methylenebutyryl)-phenoxy]acetate

Step A.—2,5-diethyl-2-(2,3 - dichloro - 4 - hydroxybenzoyl)-6-(2,3-dichloro - 4 - hydroxyphenyl) - 3,4-dihydro-2H-pyran: 2,3-dichloro - 4 - (2 - methylenebutyryl)phenol (2.8 g., 0.014 mole) is placed in an oven at 125° C. for 24 hours. The product is dissolved in 125 ml. of hot nitromethane, treated with decolorizing charcoal, filtered and then cooled to yield 1.8 g. (65%) of 2,5-diethyl-2-(2,3-dichloro-4-hydroxybenzoyl) - 6 - (2,3-dichloro-4-hydroxyphenyl)-3,4-dihydro-2H-pyran which, upon recrystallization from nitromethane melts at 197–198° C.

Analysis.—Calculated for $C_{22}H_{20}Cl_4O_4$: C, 53.90; H, 4.11; Cl, 28.93. Found: C, 53.88; H, 4.23; Cl, 28.16.

Step B.—2,5 - diethyl-2-(2,3-dichloro-4-ethoxycarbonylmethoxybenzoyl) - 6 - (2,3 - dichloro-4-ethoxycarbonylmethoxyphenyl)-3,4-dihydro-2H-pyran: A mixture of 2,5-diethyl-2-(2,3 - dichloro - 4 - hydroxybenzoyl)-6-(2,3-dichloro-4-hydroxyphenyl)-3,4-dihydro-2H-pyran (980 mg., 0.0002 mole), anhydrous potassium carbonate (1.1 g., 0.008 mole), dimethylformamide (5 ml.) and ethyl bromoacetate (1.34 g., 0.008 mole) is heated at 60° C. for one hour and poured into 100 ml. of ice water. The 2,5-diethyl-2-(2,3-dichloro - 4 - ethoxycarbonylmethoxybenzoyl)-6-(2,3-dichloro - 4-ethoxycarbonylmethoxyphenyl)-3,4-dihydro-2H-pyran which separates (1.3 g., 98%) melts at 145–147° C. following recrystallization from isopropyl alcohol.

Analysis.—Calculated for $C_{30}H_{32}Cl_4O_8$: C, 54.40; H, 4.87; Cl, 21.41. Found: C, 53.84; H, 4.92; Cl, 21.33.

Step C.—Ethyl [2,3-dichloro - 4 - (2-methylenebutyryl) - phenoxy]acetate: By substituting 2,5-diethyl-2-(dichloro-4-ethoxycarbonylmethoxybenzoyl)-6-(2,3 - dichloro-4-carboxymethoxyphenyl)-3,4-dihydro - 2H - pyran for the 2,5-diethyl-2-(2,3 - dichloro - 4 - carboxymethoxybenzoyl)-6-(2,3 - dichloro-4-carboxymethoxyphenyl)-3,4-dihydro-2H-pyran of Example 1, Step B, and following substantially the procedure described therein, the product ethyl [2,3-dichloro-4-(2 - methylenebutyryl)phenoxy]acetate, M.P. 43–45° C. (B.P. 175–181° C./0.6 mm.), is obtained.

Analysis.—Calculated for $C_{15}H_{16}Cl_2O_4$: C, 54.40; H, 4.87; Cl, 21.41. Found: C, 54.58; H, 4.94; Cl, 21.26.

EXAMPLE 3

Methyl [2,3-dichloro-4-(2-methylenebutyryl) phenoxy]acetate

Step A.—2,5-diethyl-2-(2,3-dichloro - 4 - methoxycarbonyl-methoxybenzoyl) - 6 - (2,3-dichloro-4-methoxycarbonylmethoxyphenyl) - 3,4-dihydro-2H-pyran: A mixture of 2,5-diethyl - 2 - (2,3-dichloro-4-hydroxybenzoyl)-6-(2,3-dichloro - 4 - hydroxyphenyl)-3,4-dihydro-2H-pyran (980 mg., 0.0002 mole), anhydrous potassium carbonate (1.1 g., 0.008 mole), dimethylformamide (5 ml.) and methyl bromoacetate ,1.2 g., 0.008 mole) is heated at 60° C. for one hour and poured into 100 ml. of ice water. The 2,5-diethyl - 2 - (2,3-dichloro - 4 - methoxycarbonylmethoxybenzoyl) - 6 - (2,3-dichloro - 4 - methoxycarbonylmethoxyphenyl) - 3,4 - dihydro-2H-pyran which separates melts at 185-187° C. following recrystallization from isopropyl alcohol.

Step B.—Methyl [2,3-dichloro - 4 - (2-methylenebutyryl)-phenoxy]acetate: 2,5 - diethyl - 2 - (2,3-dichloro-4-methoxycarbonylmethoxybenzoyl) - 6 - (2,3-dichloro-4-methoxycarbonylmethoxyphenyl) - 3,4-dihydro-2H-pyran (1.5 g.), is heated at 300° C. at 1 mm. pressure in a small Claisen flask with the heat of a direct flame and distilled. The distillate (800 mg.) thus obtained is identified as methyl [2,3-dichloro-4-(2-methylenebutyryl)-phenoxy]acetate, B.P. 185-187° C./0.15 mm.

Analysis.—Calculated for $C_{14}H_{14}Cl_2O_4$: C, 53.02; H, 4.45; Cl, 22.36. Found: C, 52.81; H, 4.56; Cl, 22.15.

EXAMPLE 4

Ethyl [2,3-dichloro-4-(2-methylenebutyryl) phenoxy]acetate

Step A.—2,5-diethyl - 2 - (2,3-dichloro - 4 - ethoxycarbonylmethoxybenzoyl) - 6 - (2,3-dichloro - 4 - ethoxycarbonylmethoxyphenyl)-3,4-dihydro-2H-pyran: A mixture of 2,5-diethyl - 2 - (2,3-dichloro-4-carboxymethoxybenzoyl) - 6 - (2,3-dichloro - 4 - carboxymethoxyphenyl)-3,4-dihydro-2H-pyran (3.03 g., 0.005 mole), thionyl chloride (1.44 ml., 0.02 mole) and benzene (30 ml.) is heated at reflux under anhydrous conditions for one hour. The excess thionyl chloride and benzene are distilled at reduced pressure and then benzene (50 ml.) is added and the mixture is distilled again at reduced pressure. To the residual 2,5-diethyl - 2 - (2,3-dichloro-4-chlorocarbonylmethoxybenzoyl) - 6 - (2,3-dichloro - 4 - chlorocarbonylmethoxyphenyl)-3,4-dihydro-2H-pyran thus obtained 50 ml. of ethanol is added. Upon standing for one hour there is deposited 2.4 g. (73%) of 2,5-diethyl-(2,3-dichloro - 4 - ethoxycarbonylmethoxybenzoyl) - 6 - (2,3-dichloro - 4 - ethoxycarbonylmethoxyphenyl) - 3,4 - dihydro-2H-pyran, M.P. 145-147° C.

Step. B.—Ethyl [2,3-dichloro - 4 - (2-methylenebutyryl)-phenoxy]acetate: 2,5-diethyl - 2 - (2,3-dichloro-4-ethoxycarbonylmethoxybenzoyl) - 6 - (2,3-dichloro-4-ethoxycarbonylmethoxyphenyl) - 3,4 - dihydro-2H-pyran (1.5 g.) is heated at 325° C. at 1 mm. pressure in a small Claisen flask with the heat of a direct flame and then distilled. The distillate thus obtained is identified as ethyl [2,3-dichloro - 4 - (2-methylenebutyryl)-phenoxy]-acetate, M.P. 43-45° C. (B.P. 175-181° C./0.6 mm.).

EXAMPLE 5

[3-trifluoromethyl-4-(2-methylenebutyryl)phenoxyl]-acetic acid

Step A.—2,5-diethyl - 2 - (3-trifluoromethyl - 4 - carboxymethoxybenzoyl) - 6 - (3-trifluoromethyl - 4 - carboxymethoxyphenyl)-3,4-dihydro-2H-pyran: By substituting [3-trifluoromethyl - 4 - [2-(dimethylaminomethyl)-butyryl]phenoxy]acetic acid hydrochloride for the [2,3-dichloro - 4 - (2-dimethylaminomethylbutyryl)phenoxyl]-acetic acid hydrochloride of Example 1, Step A, and following the procedure described therein, the product 2,5-diethyl-2-(3-trifluoromethyl - 4 - carboxymethoxybenzoyl) - 6 - (3-trifluoromethyl - 4 - carboxymethoxyphenyl)-3,4-dihydro-2H-pyran is obtained.

Step B.—[3 - trifluoromethyl-4-(2-methylenebutyryl) phenoxy]acetic acid: By substituting the 2,5-diethyl-2-(3-trifluoromethyl-4-carboxymethoxybenzoyl) - 6 - (3-trifluoromethyl - 4 - carboxymethoxyphenyl)-3,4-dihydro-2H-pyran obtained in Step A for the 2,5-diethyl-2-(2,3-dichloro-4-carboxymethoxybenzoyl) - 6 - (2,3-dichloro-4-carboxymethoxyphenyl)-3,4-dihydro - 2H - pyran of Example 1, Step B, and following the procedure described therein, the product [3-trifluoromethyl-2-methylenebutyryl)phenoxyl]acetic acid is obtained. The product is recrystallized from benzene to yield pure [3-trifluoromethyl-4-(2-methylenebutyryl)phenoxy]acetic acid, M.P. 107-108° C.

Analysis.—Calculated for $C_{14}H_{13}F_3O_4$: C, 55.63; H, 4.33; F, 18.86. Found: C, 56.10; H, 4.50; F, 18.25.

EXAMPLE 6

2-ethoxyethyl [2,3-dichloro-4-(2-methylenebutyryl)phenoxy]acetate

Step A.—2,5 - diethyl-2-[2,3-dichloro-4-(2 - ethoxyethoxycarbonyl)methoxybenzoyl]-6-[2,3 - dichloro-4-(2-ethoxyethoxycarbonyl)methoxyphenyl]-3,4-dihydro - 2H-pyran: A mixture of 2,5-diethyl-2-(2,3-dichloro-4-carboxymethoxybenzoyl)-6-(2,3-dichloro - 4 - carboxymethoxyphenyl)-3,4-dihydro-2H-pyran (3.03 g., 0.005 mole), thionyl chloride (1.44 ml., 0.02 mole) and benzene (30 ml.) is heated at reflux under anhydrous conditions for one hour. The excess thionyl chloride and benzene are distilled at reduced pressure and then benzene (50 ml.) is added and the mixture is distilled again at reduced pressure. To the residual 2,5-diethyl-2-(2,3-dichloro-4-chlorocarbonylbenzoyl) - 6 - (2,3-dichloro-4-chlorocarbonylmethoxyphenyl - 3,4 - dihydro-2H-pyran thus obtained, 50 ml. of 2-ethoxyethanol is added. Upon standing for one hour there is thus obtained 2,5-diethyl-2-[2,3-dichloro - 4 - (2 - ethoxyethoxycarbonyl)methoxybenzoyl]-6-[2,3-dichloro - 4 - (2-ethoxyethoxycarbonyl)methoxyphenyl]-3,4-dihydro-2H-pyran, M.P. 143-144° C.

Analysis.—Calculated for $C_{34}H_{40}Cl_4O_{10}$: C, 54.41; H, 5.37. Found: C, 54.59; H, 4.70.

Step B.—2 - ethoxyethyl [2,3-dichloro-4-(2-methylenebutyryl)phenoxy]acetate: By substituting 2,5-diethyl-2-[2,3 - dichloro-4-(2 - ethoxyethoxycarbonyl)methoxybenzonyl]-6-[2,3-dichloro - 4 - (2-ethoxyethoxycarbonyl)methoxyphenyl]-3,4-dihydro-2H-pyran for the 2,5-diethyl-2-(2,3 - dichloro - 4 - carboxymethoxybenzoyl)-6-(2,3-dichloro-4-carboxymethoxyphenyl) - 3,4 - dihydro-2H-pyran of Example 1, Step B, and following the procedure described therein, the product 2-ethoxyethyl [2,3-dichloro-4-(2-methylenebutyryl)phenoxy]acetate is obtained.

EXAMPLE 7

[2,3-dichloro-4-(2-methylenebutyryl)phenoxy]acetic acid

Step A.—2,5-diethyl-2-(2,3-dichloro-4-carboxymethoxybenzoyl)-6-(2,3-dichloro - 4 - carboxymethoxyphenyl)-3,4-dihydro - 2H - pyran: 2,5-diethyl-2-(2,3-dichloro-4-ethoxycarbonylmethoxybenzoyl) - 6 - (2,3 - dichloro-4-ethoxycarbonylmethoxyphenyl) - 3,4 - dihydro-2H-pyran (9.8 g., 0.015 mole), ethyl alcohol (750 ml.), water (400 ml.) and sodium bicarbonate (5.05 g., 0.06 mole) are refluxed for 16 hours. The ethyl alcohol is distilled off at reduced pressure and the aqueous residue is acidified with concentrated hydrochloric acid to a pH of 4. The product is extracted with ether, dried over magnesium sulfate and the ether evaporated at reduced pressure. There is thus obtained 6.1 g. (67%) of 2,5-diethyl-2-(2,3-dichloro-4-carboxymethoxybenzoyl) -6-(2,3-dichloro-4 - carboxymethoxyphenyl)-3,4-dihydro-2H-pyran, M.P. 113-115° C., following recrystallization from butyl chloride.

Step B.—[2,3-dichloro - 4 - (2-methylenebutyryl)phenoxy]-acetic acid: 2,5-diethyl-2-(2,3-dichloro-4-carboxymethoxybenzoyl) - 6 - (2,3-dichloro-4-carboxymethoxyphenyl)-3,4-dihydro-2H-pyran (4.0 g., 0.0066 mole) is heated at 275° C. at 1 mm. pressure in a small Claisen flask and then distilled. The 2.9 g. (98%) of distillate thus obtained is then recrystallized from cyclohexane to yield [2,3-dichloro - 4 - (2-methylenebutyryl)-phenoxy]-acetic acid, M.P. 124–125° C.

In a manner similar to that described in Example 1, Steps A and B for the preparation of [2,3-dichloro-4-(2-methylenebutyryl)phenoxy]acetic acid, all of the products of this invention may be obtained. Thus, by substituting the appropriate acid addition salt of [4-[2-(secondary - aminomethyl)alkanoyl]phenoxy]alkanoic acid (IIIb, infra) for the [2,3-dichloro-4-(2-dimethylaminomethylbutyryl)phenoxy]acetic acid hydrochloride of Example 1, Step A, and following substantially the procedure described in Steps A and B of that example, all of the [4-(2-methylenealkanoyl)phenoxy]alkanoic acid products of this invention and the corresponding esters and amide derivatives thereof may be obtained. The following equation illustrates the reaction of Example 1, Steps A and B and, together with Table I (infra), depict the acid addition salts of the [4-[2-(secondary-aminomethyl)alkanoyl]phenoxy]alkanoic acid starting materials of the instant process and the corresponding products (Ib, infra) derived therefrom:

The products (I) of the invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form of the products of this invention can be prepared by mixing 50 mg. of a [4-(2-methylenealkanoyl)phenoxy]alkanoic acid or a suitable acid addition salt, ester or amide derivative thereof, with 144 mg. of lactose and 6 mg. of magnesium stearate and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tables, pills or other desired unit dosages can be prepared to incorporate the compounds of this invention by conventional methods and, if desired, can be made up as elixirs or as injectable solutions by methods well known to pharmacists.

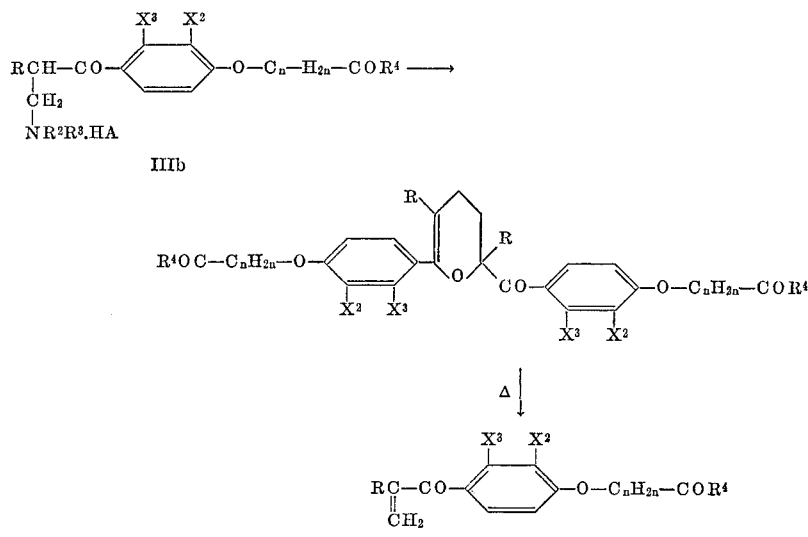

TABLE I

| Ex. | R | R⁴ | X² | X³ | —$C_nH_{2n}$— | M.P., °C. of Ia |
|---|---|---|---|---|---|---|
| 8 | —$C_2H_5$ | —OH | H | Cl | —$CH_2$— | 109–111 |
| 9 | —$C_2H_5$ | —OH | —$CH_3$ | —$CH_3$ | —$CH_2$— | 83.5–84.5 |
| 10 | —$C_2H_5$ | —OH | —CH=CH—CH=CH— | | —$CH_2$— | 106–109 |
| 11 | —$C_2H_5$ | —OH | Cl | —$CH_3$ | —$CH_2$— | 89–91 |
| 12 | —$C_2H_5$ | —OH | —$CH_3$ | Cl | —$CH_2$— | 113–114 |
| 13 | —$CH_2$—$CF_3$ | —OH | —$CH_3$ | —$CH_3$ | —$CH_2$— | 82–84 |
| 14 | —$CH(CF_3)(CH_3)$ | —OH | H | —$CH_3$ | —$CH_2$— | 116–118 |
| 15 | —$CH(CH_3)(CH_3)$ | —OH | H | Cl | —$CH_2$— | 112.5–123.5 |
| 16 | —$CH(CH_3)(CH_3)$ | —OH | Cl | Cl | —$CH_2$— | 139–140 |
| 17 | —$C_2H_5$ | —OH | H | —$CH_3$ | —$CH_2$— | 77.5–79.5 |
| 18 | —$C_2H_5$ | —OH | H | —$OCH_3$ | —$CH_2$— | 110–111.5 |
| 19 | —$C_2H_5$ | —OH | —$CH_2$—$CH_2$—$CH_2$— | | —$CH_2$— | 80–82 |
| 20 | —$C_2H_5$ | —OH | —$CH_2$—$CH_2$—$CH_2$—$CH_2$— | | —$CH_2$— | 89–91 |
| 21 | —$(CH_2)_4CH_3$ | —OH | H | Cl | —$CH_2$— | 81–82 |
| 22 | —⟨S⟩ | —OH | H | Cl | —$CH_2$— | 127–128 |
| 23 | —⟨S⟩ | —OH | Cl | Cl | —$CH_2$— | 154–155 |
| 24 | —$CH_3$ | —OH | H | Cl | —$CHCH_3$— | 115.5–116.5 |
| 25 | —$C_2H_5$ | —OH | H | Cl | —$CH[CH(CH_3)_2]$— | 94–95.5 |
| 26 | —$C_2H_5$ | —$NH_2$ | Cl | Cl | —$CH_2$— | 151–152.5 |

It is also within the scope of this invention to combine two or more of the compounds of this invention in a unit dosage form or to combine one or more of the compounds with other known diuretics and saluretics or with other desired therapeutic and/or nutritive agents in dosage unit form.

The following example is included to illustrate the preparation of a representative dosage form:

EXAMPLE 27

Dry-filled capsules containing 50 mg. of active ingredient per capsule

| | Per capsule mg. |
|---|---|
| [2,3 - dichloro - 4 - (2-methylenebutyryl)phenoxy] acetic acid | 50 |
| Lactose | 144 |
| Magnesium stearate | 6 |
| Capsule size No. 3 | 200 |

The [2,3 - dichloro - 4-(2-methylenebutyryl)phenoxy] acetic acid is reduced to a No. 60 powder and then lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of the other novel compounds of this invention.

It will be apparent from the foregoing description that the process of this invention constitutes a significant contribution to the art since it relates to a novel method for the preparation of products which exhibit a high degree of diuretic activity. One skilled in the art will also appreciate that the processes disclosed in the above examples are merely illustrative and are capable of a wide variation and modification without departing from the spirit of this invention.

What is claimed is:

1. A process for preparing a compound having the formula:

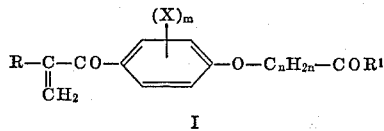

wherein R is hydrogen, alkyl, trifluoromethyl substituted lower alkyl or cycloalkyl; $R^1$ is hydroxy or an alkali metal salt of the resulting acid, lower alkoxy, amino or lower alkylamino; the X radicals are similar or dissimilar members selected from hydrogen, halogen, lower alkyl, lower alkoxy or, taken together, two X radicals on adjacent carbon atoms of the benzene ring may be joined to form an hydrocarbylene chain containing from 3–4 carbon atoms between their points of attachment; $m$ is an integer having a value of 1–2 and $n$ is an integer having a value of 1–4; which comprises heating a compound of the formula:

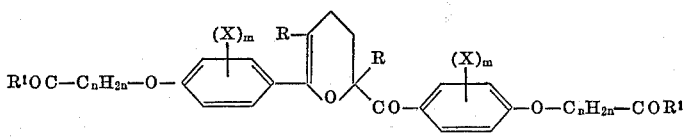

wherein R, $R^1$, X, $m$ and $n$ are defined above, at temperatures sufficient to decompose the said starting material to the corresponding [4-(2-methylenealkanoyl)phenoxy]alkanoic acid product (I).

2. The process of claim 1 wherein the temperature employed is in the range of from about 201–350° C.

3. The process of claim 1 wherein the temperature employed is in the range of from about 250–300° C.

4. The process of claim 1 wherein R is lower alkyl, X is halogen and $n$ is 1.

5. The process of claim 1 wherein R is lower alkyl, $R^1$ is lower alkoxy, X is halogen and $n$ is 1.

6. A process for preparing a compound having the formula:

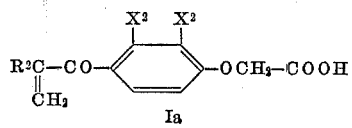

wherein $R^2$ is lower alkyl and $X^2$ and $X^3$ are similar or dissimilar members selected from hydrogen, halogen and lower alkyl; which comprises heating a compound of the formula:

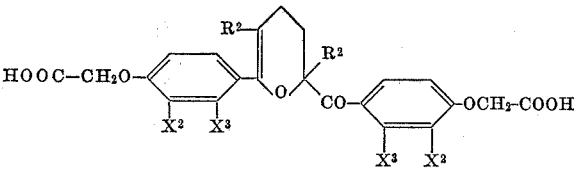

wherein $R^2$, $X^2$ and $X^3$ are as defined above, at temperatures sufficient to decompose the said starting material to the corresponding [4-(2-methylenealkanoyl)phenoxy]acetic acid product (Ia).

7. The process of claim 6 wherein the temperature employed is in the range of from about 201–350° C.

8. The process of claim 6 wherein the temperature employed is in the range of from about 250–300° C.

9. The process of claim 6 wherein $X^2$ and $X^3$ are chloro.

10. A process for preparing [2,3-dichloro-4-(2-methylenebutyryl)phenoxy]acetic acid which comprises heating 2,5 - diethyl - 2-(2,3-dichloro-4-carboxymethoxybenzoyl)- 6 - (2,3-dichloro-4-carboxymethoxyphenyl)-3,4-dihydro-2H-pyran at temperatures in the range of from about 201–350° C.

11. A process for preparing [2,3-dichloro-4-(2-methylenebutyryl)phenoxy]acetic acid which comprises heating 2,5 - diethyl - 2 - (2,3-dichloro-4-carboxymethoxybenzoyl) - 6-(2,3-dichloro-4-carboxymethoxyphenyl)-3,4-dihydro-2H-pyran at 300° C.

12. A process for preparing ethyl [2,3-dichloro-4-(2-methylenebutyryl)phenoxy]acetate which comprises heating 2,5-diethyl-2-(2,3-dichloro-4-ethoxycarbonylmethoxybenzoyl) - 6 - (2,3 - dichloro-4-ethoxycarbonylmethoxyphenyl)-3,4-dihydro-2H-pyran at 300° C.

13. A process for preparing methyl [2,3-dichloro-4-(2-methylenebutyryl)phenoxy]acetate which comprises heating 2,5 - diethyl - 2-(2,3-dichloro-4-methoxycarbonylmethoxybenzoyl) - 6 - (2,3 - dichloro-4-methoxycarbonylmethoxyphenyl)-3,4-dihydro-2H-pyran at 300° C.

No references cited.

LORRAINE A. WEINBERGER, Primary Examiner

D. STENZEL, Assistant Examiner